(12) United States Patent
Van Dijk et al.

(10) Patent No.: US 9,052,501 B2
(45) Date of Patent: Jun. 9, 2015

(54) ELECTROWETTING SYSTEM AND METHOD FOR OPERATING

(71) Applicant: Liquavista B.V., Eindhoven (NL)

(72) Inventors: Roy Van Dijk, Eindhoven (NL); Bokke Johannes Feenstra, Neunen (NL); Anthony John Slack, Lorgues (FR); Henricus Petronella Maria Derckx, Weert (NL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/319,419

(22) Filed: Jun. 30, 2014

(65) Prior Publication Data

US 2014/0313177 A1 Oct. 23, 2014

Related U.S. Application Data

(63) Continuation of application No. 12/646,047, filed on Dec. 23, 2009, now Pat. No. 8,791,891, which is a continuation of application No. PCT/EP2008/058538, filed on Jul. 2, 2008.

(30) Foreign Application Priority Data

Jul. 3, 2007 (GB) .................................. 0712859.8

(51) Int. Cl.
| G09G 3/34 | (2006.01) |
| G09G 3/10 | (2006.01) |
| G09G 5/10 | (2006.01) |
| G02B 26/00 | (2006.01) |
| G02B 3/14 | (2006.01) |
| G09G 3/36 | (2006.01) |

(52) U.S. Cl.
CPC ................ *G02B 26/005* (2013.01); *G02B 3/14* (2013.01); *G09G 3/3433* (2013.01); *G09G 3/348* (2013.01); *G09G 2300/08* (2013.01); *G09G 2310/06* (2013.01); *G09G 3/3696* (2013.01)

(58) Field of Classification Search
None
See application file for complete search history.

(56) References Cited

U.S. PATENT DOCUMENTS

| 4,079,368 A | 3/1978 | DiStefano |
| 4,165,494 A | 8/1979 | Becker |

(Continued)

FOREIGN PATENT DOCUMENTS

| JP | 9197368 | 7/1997 |
| KR | 20030087498 | 11/2003 |

(Continued)

OTHER PUBLICATIONS

Feenstra et al., "Electrowetting Displays," Liquavista BV, 2006, pp. 1-16, http://web.archive.org/web/20070220194925/ http://liquavista.com/files/LQV060828XYR15.pdf.

(Continued)

*Primary Examiner* — Nicholas Lee
(74) *Attorney, Agent, or Firm* — BainwoodHuang (57) ABSTRACT

An electrowetting system includes an electrowetting element having a first fluid and a second, immiscible fluid. The configuration of the fluids is dependent on the voltage applied to the element, the voltage being appliable upon closing a switch. With the switch being open, the voltage on the element is substantially maintainable for a period of time which is shorter than or equal to a relaxation time period of the element due to backflow.

21 Claims, 6 Drawing Sheets (56) References Cited

U.S. PATENT DOCUMENTS

| | | |
|---|---|---|
| 6,449,081 B1 | 9/2002 | Onuki et al. |
| 6,873,378 B2 | 3/2005 | Kai |
| 7,167,156 B1 | 1/2007 | Glass |
| 2002/0105600 A1 | 8/2002 | Shimoda et al. |
| 2002/0154080 A1 | 10/2002 | Miyazaki |
| 2006/0208968 A1 | 9/2006 | Moon |
| 2006/0262083 A1 | 11/2006 | Zhou et al. |
| 2006/0291125 A1 | 12/2006 | Zhou et al. |
| 2007/0047095 A1 | 3/2007 | Jung et al. |
| 2007/0086078 A1 | 4/2007 | Hagood et al. |
| 2007/0242032 A1 | 10/2007 | Cortenraad et al. |
| 2008/0074383 A1 | 3/2008 | Dean |
| 2009/0109513 A1 | 4/2009 | Bostaph |

FOREIGN PATENT DOCUMENTS

| | | |
|---|---|---|
| TW | 200725516 | 1/2007 |
| WO | 03071346 A1 | 8/2003 |
| WO | 2004068208 A1 | 8/2004 |
| WO | 2006000945 A1 | 1/2006 |
| WO | 2006054198 A1 | 5/2006 |
| WO | 2007049196 A2 | 5/2007 |
| WO | 2008059038 A1 | 5/2008 |
| WO | 2008059039 A1 | 5/2008 |
| WO | 2008059040 A1 | 5/2008 |
| WO | 2008119774 A1 | 10/2008 |

OTHER PUBLICATIONS

Feenstra et al., "A Video-Speed Reflective Display Based on Electrowetting: Principle and Properties," Journal of the SID, 12/3, 2004, pp. 1-7.

ELECTROWETTING SYSTEM AND METHOD FOR OPERATING

CROSS REFERENCE TO RELATED APPLICATIONS

This application is a continuation of U.S. Ser. No. 12/646,047 filed Dec. 23, 2009, which is a continuation of PCT/EP2008/058538 filed Jul. 2, 2008.

BACKGROUND

A system of a liquid crystal (LC) display element, a driver stage and a switch connecting the element to an output of the driver stage is known. The system is used in an active matrix display device. A storage capacitor is connected parallel to the element. The element is connected to a transistor, acting as a switch between the element and a column wire of the display device. When the transistor receives a selection signal from a row wire, the element is connected to the column wire and the data signal on the column wire is applied to the element. When no selection signal is received, the transistor is open and the element and storage capacitor are in a voltage holding state. The duration of the voltage holding state is determined by the capacitance of the element and the storage capacitor. The known system has two disadvantages. Firstly, the polarity of the voltage applied to the known element needs be alternated regularly, typically at 15 Hz or more, to avoid degradation due to charge build-up in the element and/or redox reactions occurring in the liquid crystal material. The need for an alternating voltage doubles the absolute voltage required. Secondly, the known system has a relatively short duration of the holding state.

It is desirable to provide a system that has a longer holding state. Such a longer holding state may, for example, not degrade the system, while using dc-voltages, and may allow a reduction of power consumption of the system.

DETAILED DESCRIPTION

The contents and teachings of the following applications are hereby incorporated by reference in their entirety:

(1) U.S. Ser. No. 12/646,047 filed Dec. 23, 2009

(2) PCT/EP2008/058538 filed Jul. 2, 2008

(3) GB 0712859.8 filed Jul. 3, 2007

Embodiments described herein relate to an electrowetting system comprising an electrowetting element. Embodiments also relate to a display apparatus comprising a plurality of electrowetting elements and to a method for operating the system.

Before describing detailed embodiments referencing the Figures, embodiments will be described in summary form.

In accordance with first embodiments, there is provided an electrowetting system comprising an electrowetting element, a driver stage for applying a voltage to the element, and a switch connecting the electrowetting element to an output of the driver stage, the element comprising a first fluid and a second, immiscible fluid, the instantaneous position of the fluids being dependent on the voltage applied to the element, the voltage being set when the switch is closed, and the voltage on the element being maintained during a holding state longer than 70 ms when the switch is open.

An LC element shows a degradation of performance due to permanent charge build-up in the element during the application of an electric field. Charge build-up will result in reduced image quality due to image retention and/or grey scale shifts. The degradation can be reduced by alternating the voltage applied on the LC element between +V and −V in a regular cycle. When reducing the cycle frequency below 15 Hz, charge build-up will occur. This charge build-up offsets the applied voltages, which results in different optical images during the negative and the positive part of the cycle. Hence, refresh rates lower than 15 Hz will cause a clearly visible flicker, as the human eye is very sensitive to intensity variations at frequencies around 5 to 15 Hz. These phenomena limit the frame rate of LC displays to 15 Hz or higher. When the LC element is used together with a switch, the holding time must be less than 67 ms to avoid degradation of the performance of the element.

Embodiments are based on the insight that an electrowetting element shows a behaviour different from an LC element. An electrowetting element does not show charge build-up during the application of a voltage. Hence, no alternating voltage is required to maintain a display state without degradation. The possibility to use a dc-voltage to control the electrowetting element during the entire time a certain display state must be maintained allows the application of a holding state during a period longer than 70 ms. The capacitance of the electrowetting element and the leakage current have a magnitude to maintain substantially the required voltage over the element during a holding state of longer than 70 ms. 'Substantially maintained' means that the change in the voltage changes does not cause a visible change in the display state of the element; this can be a change of less than 10%. Since the position of the fluids in the element is determined by the voltage, the position is maintained during the holding state. Such a state of the element is therefore called a quasi-stable state.

When the system including the electrowetting element is used in a display device, the display state of the element is maintained during the relatively long holding state. This effect is due to the fact that the position of the fluids in an electrowetting element follow the voltage applied to the element and the display state is determined by the position of the fluids. The quasi-stable state can be used in a large variety of display modes, ranging from direct-drive and passive matrix to active matrix displays. In addition, the quasi-stable stable state can be used in all optical modes, including transmissive, reflective and transflective mode.

Even without a storage capacitor an electrowetting element can achieve a duration of the holding state of more than 70 ms using dc-voltages without resulting in degradation of the system. Many applications of the electrowetting element can achieve holding states of such a long duration that a storage capacitor is not needed, thereby saving space of the support plate of the display device.

In an embodiment of the system the duration of the holding state is longer than 250 ms. A limiting factor for the duration of the holding state is the capacitance and the leakage current of the element and charge reposition within the element. In an LC element leakage current through the LC material affects the performance of the element. The leakage causes charges to reposition within the element when a voltage is applied across the cell-gap. The main voltage drop occurs now across the dielectric layers between the electrodes and the LC material, and as a result, the voltage drop across the LC material is reduced. This alters the optical state and therefore limits the holding time, as the holding time of the liquid crystal element is to a large extent determined by the relaxation of the liquid crystal molecules to their zero-voltage state.

The duration of the holding state of an LC element is also limited by the combination of the magnitude of the capacitance of the element and the leakage current. The holding time may be increased by increasing the capacitance. This capacitance includes the capacitance between the electrodes of the element and the storage capacitor which is integrated on a support plate of the display device. The capacitance may be increased for instance by increasing the area of the storage capacitor, by decreasing the thickness of the dielectric in the storage capacitor or by increasing the dielectric constant of the dielectric used in the storage capacitor. However, an increase in area of the storage capacitor reduces the area available for the other components of the system, such as the transistor and the wiring for the rows and columns and may increase the leakage current. Changing either the thickness or the dielectric constant of the dielectric is another possibility. However, this does not only change the capacitance, but also has a significant effect on the performance of the thin-film transistor (TFT) in the same element, as the same dielectric is normally used for the TFT and the storage capacitor and is therefore not preferred. The holding state of the LC element to maintain the desired display state must therefore be shorter than 220 ms. It should be noted that the LC element can only maintain its display state during so long a period if the above-mentioned charge build up in the element has been reduced to such an extent that the AC voltage can be applied to the element at a frequency down to 4.5 Hz without resulting in flicker.

The electrowetting element has fewer problems caused by leakage. Since leakage of current through fluids does not play a role, there is no repositioning of charge in the element. The element has a relatively large capacitance and a very low leakage current. Hence, it has a long holding time. Since the electric field caused by the charges determines the position of the fluids in the electrowetting element, the position of the fluids in the electrowetting element is maintained for a long period of time when the switch is open. As a result the element when used in a display device will maintain its display state, which is determined by the position of the fluids, for this longer period of time as well.

In an electrowetting element having the above long duration holding state, the switching between display states can be made sufficiently fast to allow showing video content on the display.

The driver stage may be arranged to apply a dc voltage to the element. Since the charge build-up common for LC elements does not occur in electrowetting elements, the electrowetting element may be controlled using a DC voltage. The use of a DC voltage simplifies the electronics and reduces the supply voltages needed for the system. The application of a DC voltage allows to maintain the polarity of the voltage between subsequent holding states.

The duration of the holding state can be increased by adding a capacitor connected parallel to the element. Whereas an LC display element requires a storage capacitor parallel to the element to reduce the effect of leakage in the element, an electrowetting element may use a capacitor to reduce the effect of variation in capacitance of the element due to the variation in position of the fluids in the element.

When the first fluid of the electrowetting element shows backflow, the duration of the holding state of the element may be shorter than the relaxation time of the backflow, in order not to affect the display. In a less-demanding application the holding state may be shorter than twice or three times the relaxation time. When the holding state lasts longer than the relaxation time, the effect of backflow may be reduced by applying one or more so-called reset pulses during the holding state. Backflow is the phenomenon that, in spite of the fact that a non-zero voltage is maintained on the element, the position of at least one of the fluids in an electrowetting element tends to recede to the position of the fluid when a zero voltage is applied to the element. A backflow relaxation time of the element is defined as the time required for the element to recede to 90% of the initial display state, starting from a transition from the inactive to the active state. The optical state or display state can be expressed in terms of e.g. transmission or reflection of an element or a combination thereof.

In an embodiment of the system the driver stage and the switch are integrated in a single element. The integration reduces the cost of the electronics. This embodiment is suitable for direct drive display devices as well as passive and active matrix displays devices. In another embodiment at least one of the driver stage or the switch is integrated on the substrate of the display device.

Further embodiments relate to a display apparatus comprising a display controller, a plurality of driver stages, a plurality of electrowetting elements, and a plurality of switches connecting each electrowetting element to an output of a driver stage, the display controller having an input for receiving display data and an output for controlling the driver stages, the element responding to an applied voltage in accordance with embodiments described herein and each element showing a display state in response to the display data, the plurality of display states forming a display.

Use of the electrowetting system according to embodiments in a display apparatus results in a low-power display apparatus. It allows the update and refresh time of the display to be relatively long, thereby reducing the power consumption of the display apparatus. For a display device addressed in frames embodiments allow a reduction of the frame rate. When reset pulses are used to counter backflow effects, the reset pulses may be applied at intervals shorter than the backflow relaxation time. The uniformity of the duration of the holding state of the display device can be increased when a capacitor is connected to each element.

The long duration of the holding state of the electrowetting element applies to all positions of the fluids, thereby providing quasi-stable states at all grey scales.

Further embodiments relate to a method for operating an electrowetting system comprising an electrowetting element, a driver stage for applying a voltage to the element, and a switch connecting the electrowetting element to an output of the driver stage, the element comprising a first fluid and a second, immiscible fluid, the instantaneous position of the fluids being dependent on the voltage applied to the element, including the steps of closing the switch and thereby setting the voltage; and opening the switch during a holding state longer than 70 ms, while the voltage on the element is substantially maintained.

An embodiment of the method has a holding state longer than 250 ms.

The element can go through a sequence of optical states if the two steps of closing and opening the switch are repeated.

Figure 1:
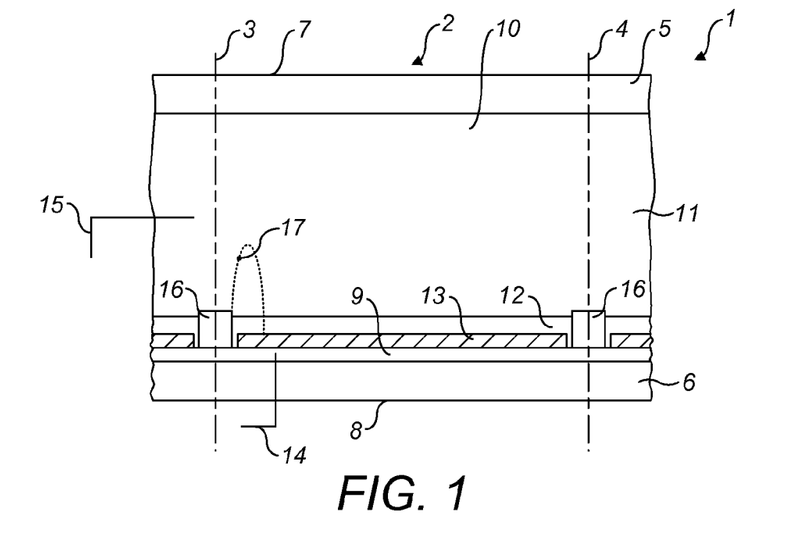
FIG. 1 shows a diagrammatic cross-section of a part of an embodiment of an electrowetting display device.

FIG. 1 shows a diagrammatic cross-section of an embodiment of an electrowetting display device 1. The display device includes a plurality of electrowetting elements 2, one of which is shown in the Figure. The lateral extent of the element is indicated in the Figure by the two dashed lines 3, 4. The electrowetting elements comprise a first support plate 5 and a second support plate 6. The support plates may be separate parts of each electrowetting element, but the support plates may be shared in common by the plurality of electrowetting elements. The support plates may be made for instance of glass or polymer and may be rigid or flexible.

The display device has a viewing side 7 on which an image or display formed by the display device can be viewed and a rear side 8. The first support plate 5 faces the viewing side; the second support plate 6 faces the rear side 8. In an alternative embodiment the display may be viewed from the rear side 8. The display device may be of the reflective, transmissive or transflective type. The display may be a segmented display type in which the image is built up of segments. The segments can be switched simultaneously or separately. Each segment includes one electrowetting element 2 or a number of electrowetting elements 2 that may be neighbouring or distant. The electrowetting elements included in one segment are switched simultaneously. The display device may also be an active matrix driven display type or a passive matrix driven display.

A space 10 between the support plates is filled with two fluids: a first fluid 12 and a second fluid 11. The second fluid is immiscible with the first fluid. The second fluid is electrically conductive or polar, and may be water or a salt solution such as a solution of potassium chloride in a mixture of water and ethyl alcohol. The second fluid may be transparent, or may be coloured, white, absorbing or reflecting. The first fluid is electrically non-conductive and may for instance be an alkane like hexadecane or (silicone) oil. A hydrophobic layer 13 is arranged on the support plate 6, creating an electrowetting surface area facing the space 10. The layer may be an uninterrupted layer extending over a plurality of electrowetting elements 2 or it may be an interrupted layer, each part extending only over one electrowetting element 2, as shown in the Figure. The layer may be for instance an amorphous fluoropolymer layer such as AF1600 or another low surface energy polymer. Alternatively the electrowetting element may be constructed with the first liquid 12, the electrode 9, the hydrophobic layer 13 and the walls 16 adjacent the first support plate 5. In this configuration the first liquid is arranged at the viewing side 7 of the space 10 instead of at the rear side 8. Also, in an alternative configuration the electrowetting elements can be positioned on top of each other to include more than one switchable filter in series in the optical path. Further integration of the switchable filters can be achieved by including one or more further first fluids in each of the electrowetting element. The hydrophobic character of the layer 13 causes the first fluid to adhere preferentially to the support plate 6 since the first fluid has a higher wettability with respect to the surface of the hydrophobic layer 13 than the second fluid. Wettability relates to the relative affinity of a fluid for the surface of a solid. Wettability increases with increasing affinity, and it can be measured by the contact angle formed between the fluid and the solid and measured internal to the fluid of interest. This increases from relative non-wettability at an angle of more than 90° to complete wettability when the contact angle is 0°, in which case the fluid tends to form a film on the surface of the solid.

Each element 2 includes an electrode 9 arranged on the second support plate 6. The electrode 9 is separated from the fluids by an insulator, which may be the hydrophobic layer 13. In general, the electrode 9 can be of any desired shape or form. The electrode 9 is supplied with voltage signals by a signal line 14. A second signal line 15 is connected to an electrode which is in contact with the conductive second fluid 11. This electrode may be common to all elements, when they are fluidly interconnected by and share the second fluid, uninterrupted by walls. The electrowetting elements 2 are controlled by a voltage $V_e$ applied between the signal lines 14 and 15. The electrodes 9 on the support plate 6 each are connected to a display driving system by a matrix of printed wiring on the support plate.

In a display of the segment type, the electrode 9 may extend over several elements and define an image region of a plurality of electrowetting elements, which will all be switched simultaneously. When a segment covers several electrowetting elements, the signal line 14 is a common signal line for these electrowetting elements.

The lateral extent of the first fluid 12 is constrained to one electrowetting element by walls 16 that follow the cross-section of the electrowetting element in the plane A-B. In the embodiment shown in FIG. 1 the walls define the extent of the hydrophobic layer 13. When the hydrophobic layer extends over a plurality of elements, the walls may be arranged on top of the layer. Further details of the electrowetting elements of the display are described amongst others in international patent application WO 03071346.

The first fluid absorbs at least a part of the optical spectrum. The fluid may be transmissive for a part of the optical spectrum, forming a colour filter. For this purpose the fluid may be coloured by addition of pigment particles or dye. Alternatively, the first fluid may be black, i.e. absorb substantially all parts of the optical spectrum, or reflecting. The hydrophobic layer may be transparent or reflective. A reflective layer may reflect the entire visible spectrum, making the layer appear white, or part of it, making it have a colour.

When the voltage $V_e$ applied between the signal lines 14 and 15 is set at a non-zero active signal level $V_a$, the element will enter into an active state. Electrostatic forces will move the second fluid 11 towards the segment electrode 9, thereby repelling the first fluid 12 from at least part of the area of the hydrophobic layer 13 towards the walls 16 surrounding the area of the hydrophobic layer. When fully repelled the first fluid is in a drop-like form as schematically indicated by a dashed line 17. This action uncovers the first fluid from the surface of the hydrophobic layer 13 of the electrowetting element. When the voltage across the element is returned to an in-active signal level of zero or a value near to zero, the element will return to an inactive state, where the first fluid flows back to cover the hydrophobic layer 13. In this way the first fluid forms an electrically controllable optical switch in each electrowetting element.

The electrowetting element forms a capacitor. The second fluid 11 and the electrode 9 form the plates and the first fluid 12 and the hydrophobic layer 13 the dielectric layer. When the first fluid is in the active state, i.e. having the form 17, the capacitance of the element is higher than when the first fluid is in the in-active state, i.e. having the form 12.

Figure 2A:
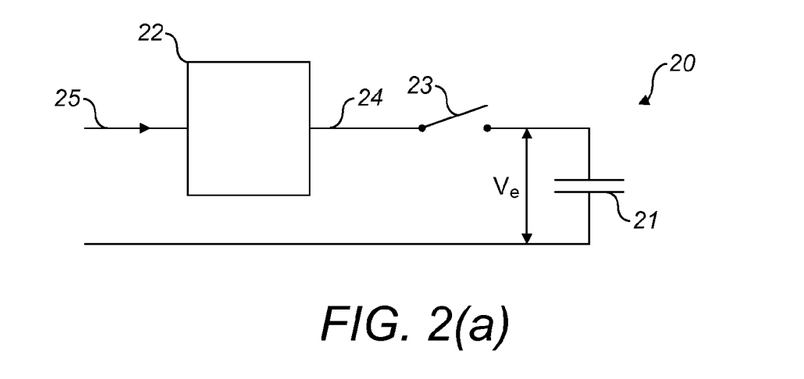
FIG. 2(a) shows an electrowetting system.

FIG. 2(a) shows an electrowetting system 20 comprising an electrowetting element, shown as a capacitor 21, a driver stage 22 for applying a voltage $V_e$ to the element and a switch 23 connecting the electrowetting element 21 to an output 24 of the driver stage. The driver stage 22 receives a signal from the display controller at its input 25 for setting the voltage $V_e$ over the electrowetting element. When the switch 23 is closed, the capacitor 21 is charged to the voltage $V_e$. After opening the switch 23, the voltage level is maintained during a holding state. The duration of this state depends on the capacitance of the capacitor 21 and the leakage current of the electrowetting element and of the switch. When the switch is integrated in the driver stage, the leakage current is that of the driver stage in its high-impedance state. A typical electrowetting element having a cross-section of 150 μm by 150 μm has a capacitance of 0.1 pF when in the in-active state and 0.5 pF when in the active state and a leakage current of less than 0.2 pA. A typical electronic switch, such as a thin-film transistor (TFT), has an open resistance of approximately $10^{12}$-$10^{13}\Omega$ or higher.

These values allow a duration of the holding state of more than 70 ms. For static applications, such as watch displays, electronic books, electronic dictionaries, GPS devices, a typical duration is 100 ms to 1 s that will result in a significant reduction of power consumption. The relatively long holding state for the electrowetting element is not due to a slow response of the first fluid to return to the in-active state, but due to the fact that the voltage is maintained over the element. Since the usual electrowetting element is not bi-stable but quasi-stable, the voltage over the element must be maintained to maintain the display state, in contrast with bi-stable elements such as an electrophoretic element, where in either of the two states no voltage is required to maintain the state. The holding time is defined as the time from the opening of the switch till the moment the voltage over the element has dropped such that the display state has reduced to 90% of the display state on opening the switch. The duration of the holding state may be sufficiently short not to cause a visible change in the optical state of the element. Demanding applications may require that the duration of the holding state is shorter than the holding time. Less demanding applications may require that the duration of the holding state is shorter than two or three times the holding time. At the end of the holding state the element is refreshed by bringing the voltage up to the required level again.

Since an electrowetting element is not bi-stable, such as an electrophoretic element, but quasi-stable, it is easier for an electrowetting element to attain positions of the first and second fluid in between the active and in-active state. In such a state the element has a so-called grey-value display state, which can also be maintained when the switch is open. Furthermore, an electrowetting element having a long duration holding state can switch sufficiently fast between the display states for showing video images having a refresh rate of e.g. 10 or 20 ms.

Figure 2B:
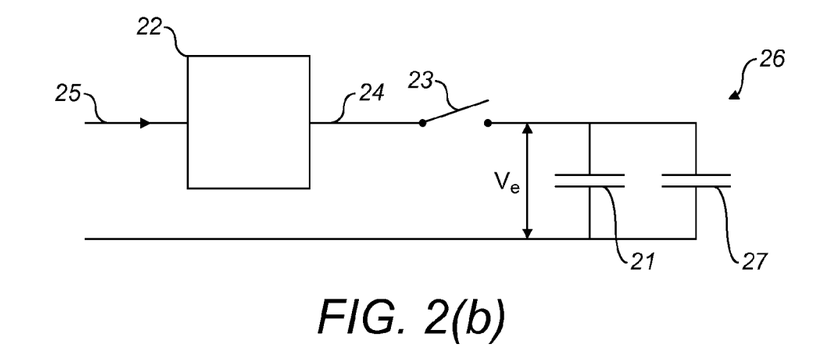
FIG. 2(b) shows an electrowetting system including a storage capacitor.

FIG. 2(b) shows an electrowetting system 26 similar to that of FIG. 2(a). A storage capacitor 27 is connected parallel to the element 21. The capacitance determining the duration of the holding state is the capacitance of capacitors 21 and 27. The storage capacitor may be connected to any fixed voltage line.

In FIGS. 2(a) and (b) the switch 23 is shown as a separate element between the output 24 of the driver stage 22 and the electrowetting element 21. It is also possible to integrate the switch and the driver stage in a manner similar to that disclosed in U.S. Pat. No. 4,165,494 for a bi-state linear amplifier. This amplifier can switch between a low-impedance amplification state and a very high output impedance state. The integrated switch has a lower power consumption and cheaper implementation. Moreover, an integrated switch requires a smaller area on the display or PCB (printed circuit board).

The capacitance of the electrowetting cell may be tuned by choosing the thickness, dielectric constant or material of the insulating layer 13, e.g. by making the dielectric layer of a hydrophobic layer and an insulating layer.

Although the electrowetting element in FIGS. 1 and 2 is described as a picture element in a display device, it may be used in any application where maintaining the position of the fluids can be used, such as a general light valve, an optical diaphragm, an adjustable lens, etc.

Figure 3A:
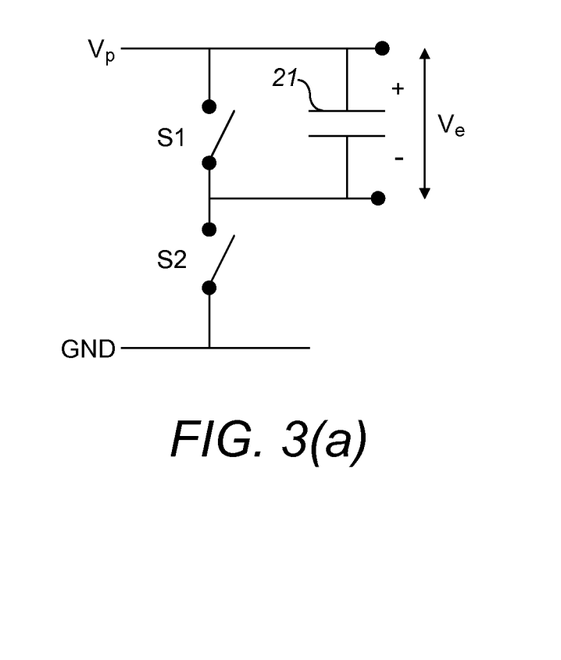
FIG. 3(a) shows an alternative embodiment of a driver stage.

In FIG. 3A, a known embodiment of a push-pull stage is indicated. The element state is determined by the combination of states for switches S1 and S2: when S1 is on and S2 is off, the element voltage is 0 and the element is in the off-state. When S1 is off and S2 is on, the element voltage is equal to −Vp, switching the element to the on-state.

Figure 3B:
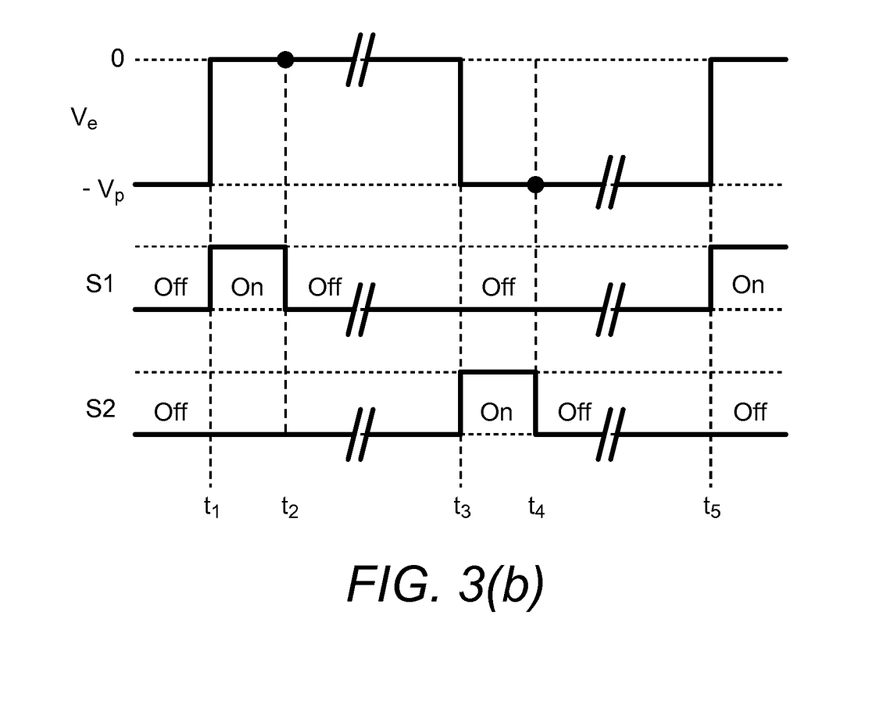
FIG. 3(b) shows a timing diagram of the embodiment of FIG. 3(a)

FIG. 3(a) shows an alternative embodiment of the driver stage for switching an electrowetting element, indicated by the capacitor 21, between an active state and an inactive state. A voltage $V_p$ is a voltage common for a plurality of electrowetting elements and applied to electrode 15 in FIG. 1. S1 and S2 are switches. FIG. 3(b) shows a timing diagram of the switches. At time $t_1$ the element must be set in an inactive display state according to display data. Therefore, the switch S1 is closed and switch S2 is open (indicated as 'On' and 'Off', respectively, in the Figure). The voltage $V_e$ across the element, shown in the top trace of the Figure, is zero, resulting in an inactive element. At $t_2$ both switches are opened and the voltage $V_e$ remains zero. At $t_3$ the display state of the element must be updated and the element be set in an active state. The switch S1 is open and S2 is closed. The voltage across the element is now $-V_p$. The negative sign is a consequence of the convention to indicate the voltage at electrode 15 as zero. When at $t_4$ the switch S2 is opened, the voltage $V_e$ remains substantially equal to $-V_p$. At $t_5$ the element is set in the inactive state by closing switch S2.

In the holding states $t_2$-$t_3$ and $t_4$-$t_5$ the impedance as seen from the capacitor 21 is high because of the open switches. Since the leakage current of the element and switch is low, the voltage will remain on the element. The display state of the element is maintained in the holding state because of the quasi-stability of the element. The element does not need to be re-addressed before the display state is changed or the holding time expires, resulting in a strong reduction of power consumption in the overall system. The mode of switching shown in FIG. 3(b) is called tri-state switching because of the three different states as seen from the element: low impedance zero voltage, low impedance high voltage and high impedance any voltage.

Figure 4A:
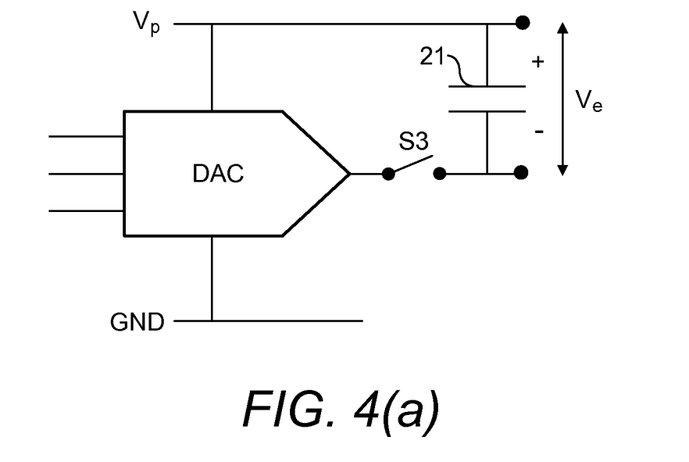
FIG. 4(a) shows an alternative embodiment of a driver stage.
Figure 4B:
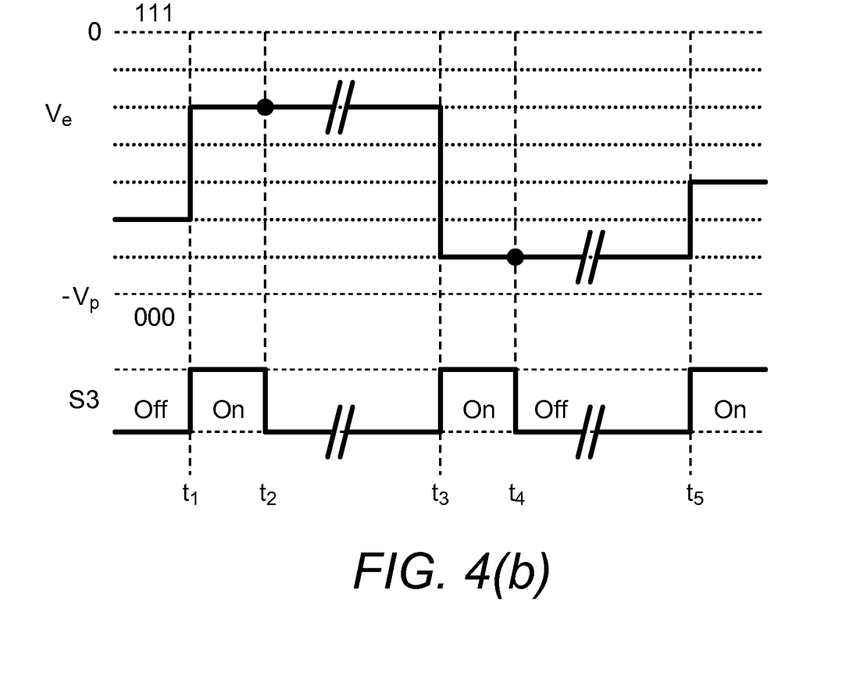
FIG. 4(b) shows a timing diagram of the embodiment of FIG. 4(a)

The switching procedure of FIG. 3(b) is for a driver stage having two voltage states, but a similar procedure holds for other embodiments, for example driver stages having multiple output voltages and suitable for amplitude modulated grey scales, multiple switches, non-push-pull driver stages, or digital-to-analog converters. An embodiment of a driver stage with a 3-bit DAC (digital-to-analog converter) providing 8 output levels is shown in FIG. 4(a). The output of the DAC is connected to the electrowetting element 21 via a switch S3. FIG. 4(b) shows the timing diagram of the driver stage. The voltage $V_e$ across the element shows 8 levels between zero volt and $-V_p$, corresponding to the digital DAC input values 111 and 000, respectively. At time $t_1$ the switch S3 is closed and a voltage $V_e$ corresponding to the digital input 101 is applied to the element. At $t_2$ the switch is opened and the element enters in a high-impedance holding state till $t_3$. At $t_3$ the display state is updated to the digital input 001 and at $t_4$ the element is again in the holding state. The same procedure applies to driver stages having any number of output voltages.

The impedance switching can also be combined with other methods of addressing electrowetting elements, such as addressing using frame-mixing or spatial mixing and the ones described in patent application GB 0706278.9 (reset pulse and intermittent supply voltage), patent application GB 0622898.5 (booster burst modes), patent application GB 0622900.9 (Vcom modulation).

Figure 5A:
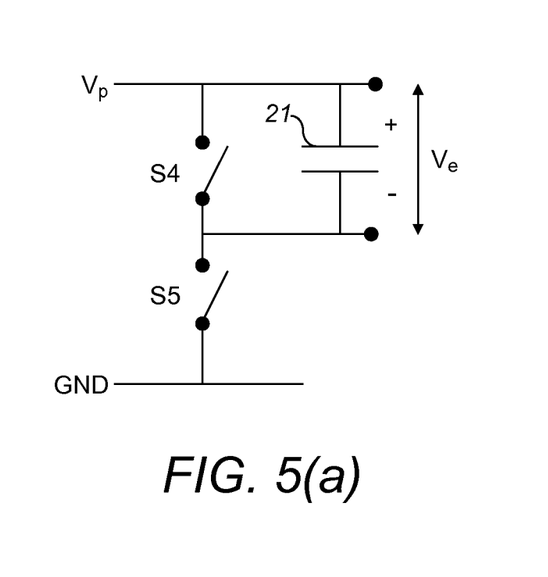
FIG. 5(a) shows an alternative embodiment of a driver stage.
Figure 5B:
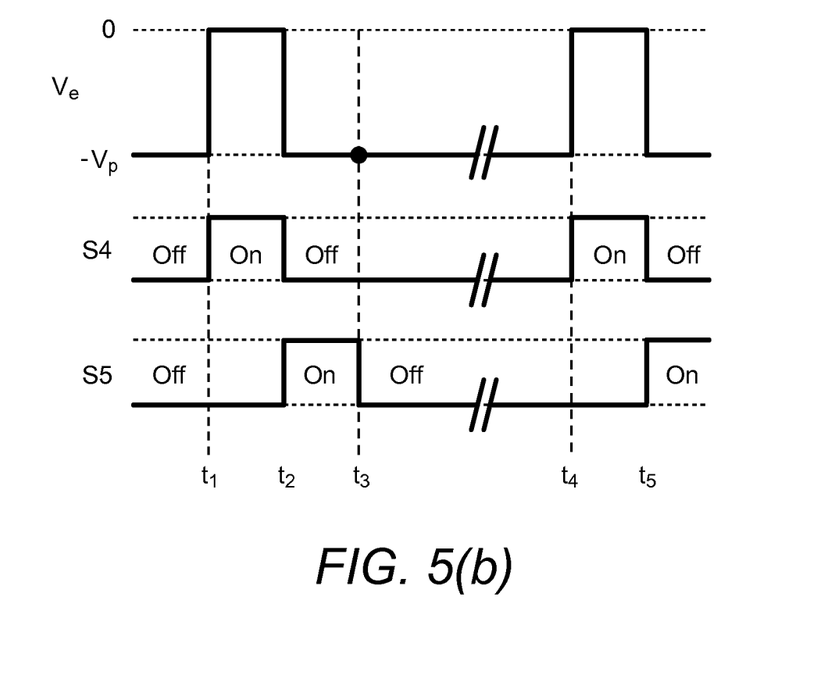
FIG. 5(b) shows a timing diagram of the embodiment of FIG. 5(a)

FIG. 5(a) shows a driver stage that combines impedance switching with reset pulses. The voltage Ve over the element 21 can be switched between zero volts and −Vp by two switches S4 and S5. FIG. 5(b) shows the timing diagram of the driver stage. At time $t_1$, the end of a holding state, the switch S4 is switched on, reducing the voltage Ve across the element to zero. After a short period, at $t_2$, S4 returns to the open state and S5 closes, setting $V_e$ to $-V_p$. The reset pulse is applied in the period from $t_1$ to $t_2$. The period must be sufficiently short lest the reset pulse affects the observed display state of the element. Once the element has been recharged, the switch S5 is opened again at $t_3$, setting the element in the holding state. The holding state ends at $t_4$, when the switch S4 closes again for the next reset pulse, which lasts till $t_5$. In the holding state the power consumption is substantially zero. When the holding state is long compared to the charging and reset periods, the overall power reduction will be significant.

Figure 6:
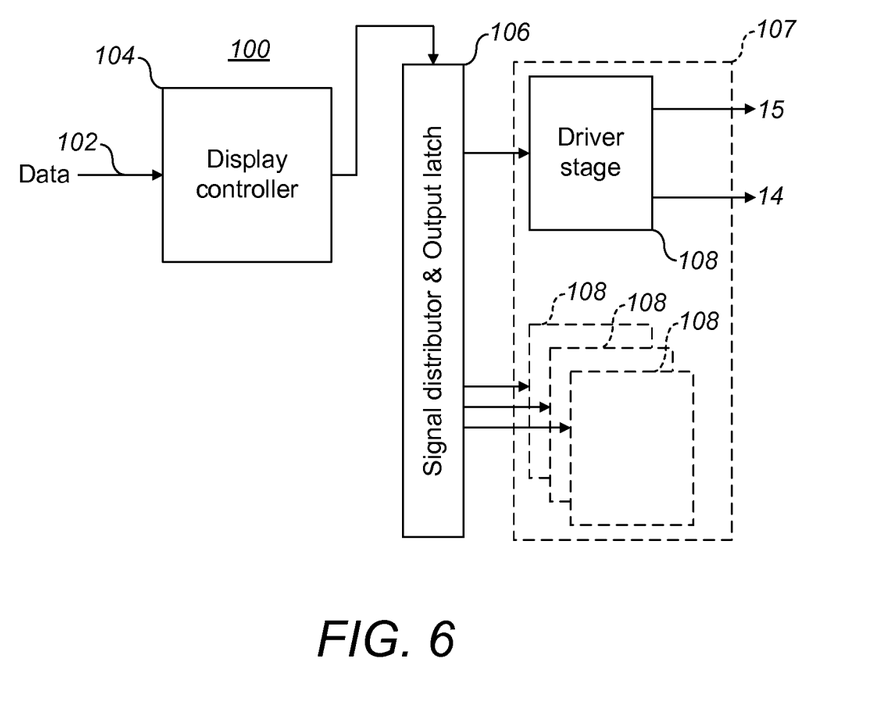
FIG. 6 shows a first embodiment of a display driving system.

FIG. 6 shows a diagrammatic view of an embodiment of an electrowetting display driving system. The display driving system is of the so-called direct drive type and may be in the form of an integrated circuit which may be adhered to the support plate 6 shown in FIG. 1 or integrated in the electronics elsewhere in the display module, for instance on the PCB. The display driving system 100 is connected to the display device by means of signal lines 14 and a common signal line 15. Each electrode signal line 14 connects an output from the display driving system 100 to a different electrode 9, respectively. The common signal line is connected to the second, conductive fluid 11 through an electrode. Also included are one or more input display data lines 102, whereby the display driving system can be instructed with data so as to determine which elements should be in an active state and which elements should be in a non-active state at any moment of time.

By selectively actuating certain of the electrodes 9 with an active voltage signal, the corresponding electrowetting elements are driven to an open state, in which the first fluid 12 is at least partly removed from the surface of the support plate 6, whilst other non-selected electrodes are driven with a non-active voltage signal which is equal to, or at least substantially equal to, a common voltage signal applied to the common signal line 15.

The embodiment of the controller shown comprises a display controller 104, e.g. a microcontroller or hardware controller, receiving input data from the input data lines 102 relating to the image to be displayed. The output of the microcontroller is connected to the data input of a signal distributor and data output latch 106. The signal distributor distributes incoming data over a plurality of outputs connected to the display device, preferably via driver stages 108. The signal distributor causes data input indicating that a certain element is to be set in a specific display state to be sent to the output connected to this element. The distributor may be a shift register. The input data is clocked into the shift register and at receipt of a latch pulse the content of the shift register is copied to the output latch. The output latch has one or more outputs, connected to a driver assembly 107. The outputs of the latch are connected to the inputs of one or more driver stages 108 within the driving system. The outputs of each driver stage are connected through the signal lines 14 and 15 to a corresponding display element. The above display driving system can be used for direct-drive displays, active matrix displays or passive matrix displays.

Each driver stage includes a switch as shown in FIG. 2, either as a separate element or integrated. The switch is controlled by a control signal. Each driver stage may generate this control signal itself, closing the switch when a voltage is received from the distributor 106 and opening the switch again after a certain period. The driver stages may use a common control signal to control the switches. A driver stage may also receive the control signal from the distributor.

In response to the input data a driver stage will output a voltage to set one of the elements in a display state. When the switch opens, the element is in the holding state.

Figure 7:
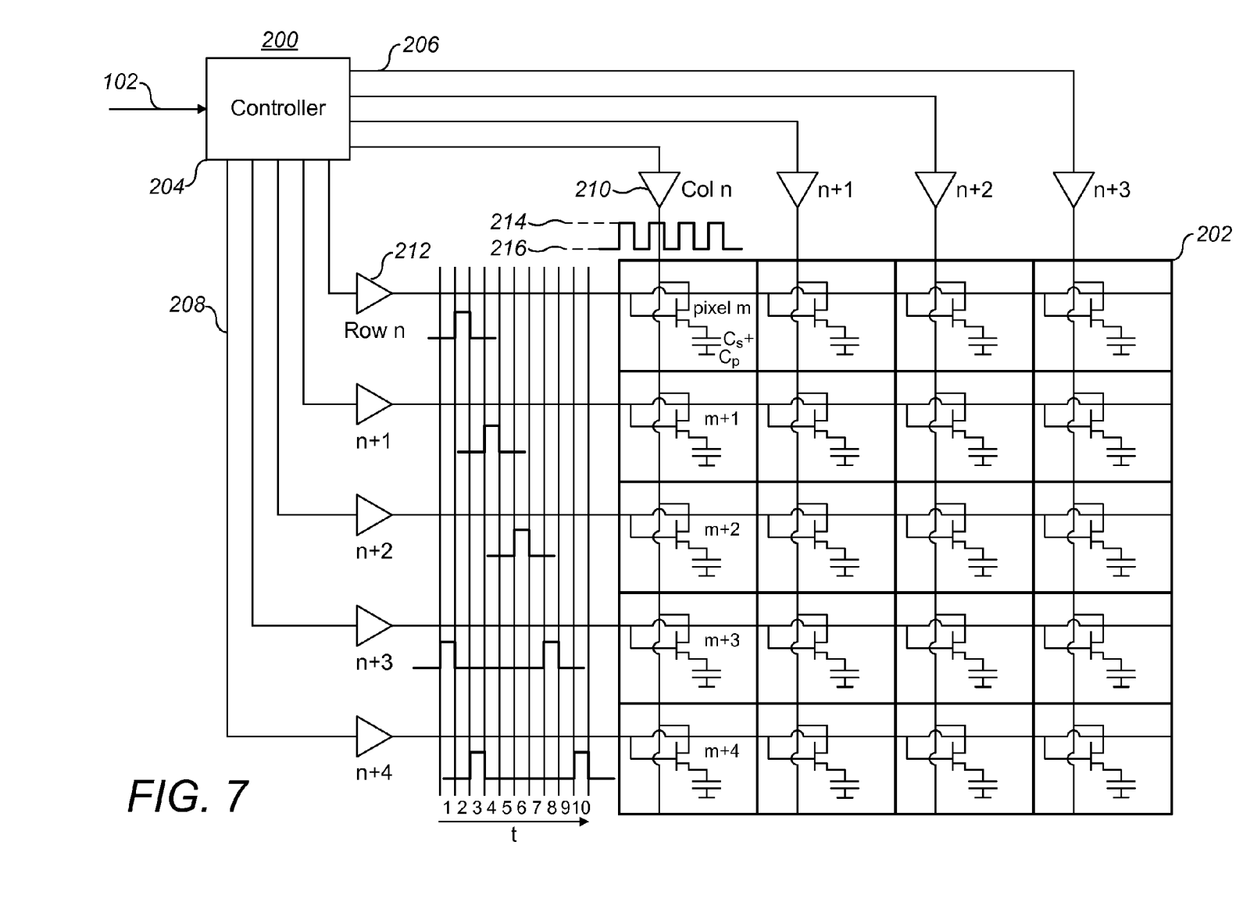
FIG. 7 shows a second embodiment of a display driving system.

FIG. 7 shows a diagrammatic view of another embodiment of an electrowetting display driving system 200 for controlling the image of a matrix display device 202. The display elements of the display device are arranged in the form of a matrix having a plurality of columns and a plurality of rows. The Figure shows four columns labelled n to n+3 and five rows labelled n to n+4.

The display driving system 200 is of the so-called active matrix type and may be in the form of an integrated circuit which may be adhered to the support plate 6. The controller shown comprises a microcontroller or hardware controller 204 including control logic and switching logic. It receives input data from the input data lines 102 relating to the image to be displayed. The microcontroller has an output for each column of the display device, providing a column signal. A column signal line 206 connects each output to a column of the display device. The microcontroller also has an output for each row of the display device, providing a row selection signal. A row signal line 208 connects each output to a row of the display device. A column driver 210 and a row driver 212 is arranged in each column and row signal line, respectively. The Figure shows the signal lines only for those columns and rows shown in the Figure. The row drivers may be integrated in a single integrated circuit. Similarly, the column drivers may be integrated in a single integrated circuit. The integrated circuit may include the complete driver assembly. The integrated circuit may be integrated on the support plate 6 of the display device. The integrated circuit may include the entire display driving system.

Each element of the display device 202 includes an active element in the form of one or more transistors. The transistor may be a thin-film transistor. The transistor operates as a switch. The electrodes of the element are indicated as a capacitor $C_p$. The line connecting the capacitor to ground is the common signal line 15 and the line connecting the capacitor to the transistor is the signal line 14 shown in FIG. 1. The element may include a capacitor $C_s$ for storage purposes or for making the duration of the holding state or the voltage applied to the element uniform across the display device. This capacitor is arranged in parallel with $C_p$ and is not separately shown in FIG. 7. The column drivers provide the signal levels corresponding to the input data for the elements. The row drivers provide the signals for selecting the row of which the elements are to be set. The Figure shows a series of selecting signals for the rows for times t=1 to 10. A sequence of voltages of one of the column drivers 210 is shown in the Figure. The signal levels 214 and 216 indicate signal levels corresponding to input data.

When the transistor of an element receives a row selection signal, it passes the signal level of its column driver to the electrodes of the cell. After the transistor has been switched off, the voltage over the cell will substantially be maintained until the transistor is switched on again by the next row selection signal for the element. The time during which the transistor is switched off is the holding state of the element.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the accompanying claims.

What is claimed is:

1. An electrowetting system comprising an electrowetting element, a driver stage for applying a voltage to the electrowetting element, and a switch connecting the electrowetting element to an output of the driver stage, the electrowetting element comprising a first fluid and a second, immiscible fluid, a configuration of the first and second fluids being dependent on the voltage applied to the electrowetting element, the voltage being appliable to the electrowetting element upon closing the switch and, with the switch being open, the voltage being substantially maintainable on the electrowetting element for a period of time which is one or more of: shorter than or equal to a relaxation time period of the electrowetting element due to backflow.

2. The electrowetting system according to claim 1, wherein the period of time starts upon opening the switch and ends upon closing the switch.

3. The electrowetting system according to claim 1, wherein, during the relaxation time period, the first and second fluids tend to flow from a first configuration of the first and second fluids back to a second configuration of the first and second fluids, the first configuration of the first and second fluids being set upon opening the switch after applying the voltage to the electrowetting element and the second configuration of the first and second fluids being different from the first configuration.

4. The electrowetting system according to claim 1, wherein the period of time is longer than one or more of: 70 ms or 250 ms.

5. The electrowetting system according to claim 1, wherein the relaxation time period ends when a display state of the electrowetting element has reduced to 90% of a display state of the electrowetting element set upon opening the switch.

6. The electrowetting system according to claim 1, the first and second fluids having a first configuration upon opening the switch and a second configuration at an end of the relaxation time period,
wherein an amount of light output by the electrowetting element with the first and second fluids being in the second configuration is 90% of an amount of light output by the electrowetting element with the first and second fluids being in the first configuration.

7. The electrowetting system according to claim 1, the electrowetting element comprising a support plate having a display area, a display state of the electrowetting element depending on an area of the display area adjoined by the first fluid,
the first fluid adjoining a first area of the display area upon opening the switch and the first fluid adjoining a second area of the display area at an end of the relaxation time period,
wherein a size of the second area is 90% of a size of the first area.

8. The electrowetting system according to claim 1, wherein a display state of the electrowetting element at a start of the period of time is substantially the same, as perceived by a viewer of the electrowetting element, as a display state of the electrowetting element at an end of the period of time.

9. The electrowetting system according to claim 1, wherein the configuration of the first and second fluids is substantially maintainable during the period of time.

10. The electrowetting system according to claim 1, wherein the electrowetting element has a capacitance with a magnitude configured for substantially maintaining the voltage on the electrowetting element during said period of time.

11. The electrowetting system according to claim 1, the electrowetting element comprising a support plate including at least one wall surrounding a display area, a display state of the electrowetting element depending on an area of the display area adjoined by the first fluid,
wherein the first fluid is confined by the at least one wall to adjoin the display area.

12. Apparatus for controlling an electrowetting element including a first fluid and a second fluid immiscible with the first fluid, the apparatus including:
at least one processor; and
at least one memory including computer program instructions, the at least one memory and the computer program instructions being configured to, with the at least one processor, cause the apparatus to perform:
a method of controlling an electrowetting element comprising:
closing a switch to apply a voltage to the electrowetting element, the switch connecting the electrowetting element to an output of a driver stage for applying the voltage to the electrowetting element; and
opening the switch for a period of time, the voltage being substantially maintained on the electrowetting element for the period of time, the period of time being one or more of: shorter than or equal to a relaxation time period of the electrowetting element due to backflow.

13. The apparatus according to claim 12, wherein the relaxation time period ends when a display state of the electrowetting element has reduced to 90% of a display state of the electrowetting element set upon opening the switch.

14. The apparatus according to claim 12, the first and second fluids having a first configuration upon opening the switch and a second configuration at an end of the relaxation time period,
wherein an amount of light output by the electrowetting element with the first and second fluids being in the second configuration is 90% of an amount of light output by the electrowetting element with the first and second fluids being in the first configuration.

15. The apparatus according to claim 12, the electrowetting element comprising a support plate having a display area, a display state of the electrowetting element depending on an area of the display area adjoined by the first fluid,
the first fluid adjoining a first area of the display area upon opening the switch and the first fluid adjoining a second area of the display area at an end of the relaxation time period,
wherein a size of the second area is 90% of a size of the first area.

16. The apparatus according to claim 12, wherein a display state of the electrowetting element at a start of the period of time is substantially the same, as perceived by a viewer of the electrowetting element, as a display state of the electrowetting element at an end of the period of time.

17. A method for controlling an electrowetting element including a first fluid and a second fluid immiscible with the first fluid, comprising:
   closing a switch to apply a voltage to the electrowetting element, the switch connecting the electrowetting element to an output of a driver stage for applying the voltage to the electrowetting element; and
   opening the switch for a period of time, the voltage being substantially maintained on the electrowetting element for the period of time, the period of time being one or more of: shorter than or equal to a relaxation time period of the electrowetting element due to backflow.

18. The method according to claim 17, wherein the relaxation time period ends when a display state of the electrowetting element has reduced to 90% of a display state of the electrowetting element set upon opening the switch.

19. The method according to claim 17, the first and second fluids having a first configuration upon opening the switch and a second configuration at an end of the relaxation time period, wherein an amount of light output by the electrowetting element with the first and second fluids being in the second configuration is 90% of an amount of light output by the electrowetting element with the first and second fluids being in the first configuration.

20. The method according to claim 17, the electrowetting element comprising a support plate having a display area, a display state of the electrowetting element depending on an area of the display area adjoined by the first fluid,
   the first fluid adjoining a first area of the display area upon opening the switch and the first fluid adjoining a second area of the display area at an end of the relaxation time period,
   wherein a size of the second area is 90% of a size of the first area.

21. The method according to claim 17, wherein a display state of the electrowetting element at a start of the period of time is substantially the same, as perceived by a viewer of the electrowetting element, as a display state of the electrowetting element at an end of the period of time.

* * * * *